(12) United States Patent
Chen et al.

(10) Patent No.: US 8,955,735 B2
(45) Date of Patent: Feb. 17, 2015

(54) METHOD FOR ENHANCING THE YIELD RATE OF BALL IMPLANTING OF A SUBSTRATE OF AN INTEGRATED CIRCUIT

(71) Applicant: Zen Voce Corporation, Hsinchu County (TW)

(72) Inventors: Chao-Shang Chen, Hsinchu County (TW); Yu-Kai Lin, Hsinchu County (TW)

(73) Assignee: Zen Voce Corporation, Hsinchu County (TW)

( * ) Notice: Subject to any disclaimer, the term of this patent is extended or adjusted under 35 U.S.C. 154(b) by 0 days.

(21) Appl. No.: 13/896,393

(22) Filed: May 17, 2013

(65) Prior Publication Data

US 2014/0339291 A1 Nov. 20, 2014

(51) Int. Cl.
*B23K 31/02* (2006.01)
*B23K 3/06* (2006.01)

(52) U.S. Cl.
CPC .................................... *B23K 3/0623* (2013.01)
USPC ........................... 228/246; 228/41; 228/248.1

(58) Field of Classification Search
None
See application file for complete search history.

(56) References Cited

U.S. PATENT DOCUMENTS

| | | | | |
|---|---|---|---|---|
| 4,871,110 A | * | 10/1989 | Fukasawa et al. | 228/245 |
| 5,782,399 A | * | 7/1998 | Lapastora | 228/41 |
| 5,941,449 A | * | 8/1999 | Le Coz et al. | 228/248.1 |
| 6,030,889 A | * | 2/2000 | Aulicino et al. | 438/613 |
| 6,041,996 A | * | 3/2000 | Arikado | 228/180.22 |
| 6,112,975 A | * | 9/2000 | Lapastora | 228/248.1 |
| 6,234,382 B1 | * | 5/2001 | Rischke et al. | 228/245 |
| 6,390,351 B1 | * | 5/2002 | Kasai et al. | 228/41 |
| 6,533,159 B1 | * | 3/2003 | Cobbley et al. | 228/20.1 |
| 6,533,160 B1 | * | 3/2003 | Bourrieres et al. | 228/41 |
| 6,551,863 B2 | * | 4/2003 | Johnson et al. | 438/127 |
| 7,726,546 B2 | * | 6/2010 | Maeda | 228/180.22 |
| 7,743,964 B2 | * | 6/2010 | Maeda | 228/180.22 |
| 2002/0058406 A1 | * | 5/2002 | Mukuno et al. | 438/626 |
| 2003/0111508 A1 | * | 6/2003 | Cobbley et al. | 228/41 |
| 2003/0127501 A1 | * | 7/2003 | Cheng et al. | 228/246 |
| 2004/0183186 A1 | * | 9/2004 | Hirose | 257/690 |
| 2006/0169743 A1 | * | 8/2006 | Ng et al. | 228/39 |
| 2007/0111500 A1 | * | 5/2007 | Cowens et al. | 438/612 |
| 2010/0123257 A1 | * | 5/2010 | Liu | 257/777 |
| 2011/0092066 A1 | * | 4/2011 | MacKay | 438/616 |
| 2012/0292377 A1 | * | 11/2012 | Shoji et al. | 228/248.1 |

* cited by examiner

*Primary Examiner* — Kiley Stoner
(74) *Attorney, Agent, or Firm* — Alan D. Kamrath; Kamrath IP Lawfirm, P.A.

(57) ABSTRACT

A method is used for implanting solder balls of an integrated circuit by operating a ball implanting machine. The ball implanting machine includes a suction fixture, an evacuating device, two pivoting and inverting devices, a guide plate, a ball carrier, and a substrate. The suction fixture has a plurality of ball grooves. The guide plate has a plurality of guide holes each aligning with a respective one of the ball grooves of the suction fixture. The ball carrier contains a plurality of solder balls. Thus, each of the solder balls is extended through the respective guide hole of the guide plate into the respective ball groove of the suction fixture, so that the solder balls will not protrude outward from the guide plate and will not interfere with or jam each other during movement of the ball carrier.

7 Claims, 24 Drawing Sheets

METHOD FOR ENHANCING THE YIELD RATE OF BALL IMPLANTING OF A SUBSTRATE OF AN INTEGRATED CIRCUIT

BACKGROUND OF THE INVENTION

1. Field of the Invention

The present invention relates to a ball implanting method and, more particularly, to a method for implanting solder balls on a substrate of an integrated circuit.

2. Description of the Related Art

A conventional ball implanting machine for an integrated circuit in accordance with the prior art shown in FIGS. 1-14 comprises a suction fixture 10, an evacuating device 20, two pivoting and inverting devices 24, a ball carrier 30, and a substrate 40. The suction fixture 10 is initially located above the evacuating device 20. The suction fixture 10 is provided with a plurality of ball grooves 11 and a plurality of through holes 12. Each of the through holes 12 of the suction fixture 10 is connected to a respective one of the ball grooves 11. The evacuating device 20 is combined with the suction fixture 10. The evacuating device 20 is provided with a vacuum chamber 21, a plurality of connecting holes 22, and an air hole 23. Each of the connecting holes 22 of the evacuating device 20 is connected between a respective one of the through holes 12 of the suction fixture 10 and the vacuum chamber 21. The vacuum chamber 21 of the evacuating device 20 is connected between each of the connecting holes 22 and the air hole 23. The air hole 23 of the evacuating device 20 draws air outward from the vacuum chamber 21 or introduces ambient air into the vacuum chamber 21. The pivoting and inverting devices 24 are mounted on two opposite sides of the evacuating device 20 to pivot and invert the suction fixture 10 and the evacuating device 20. The ball carrier 30 is movably mounted on the suction fixture 10. The ball carrier 30 contains a plurality of solder balls 1. The substrate 40 is located under the evacuating device 20. The substrate 40 is provided with a plurality of soldering pastes 41.

In operation, the ball carrier 30 is moved on the suction fixture 10 reciprocally as shown in FIGS. 2 and 3 to introduce each of the solder balls 1 into the respective ball groove 11 of the suction fixture 10. Then, the evacuating device 20 draws air in the vacuum chamber 21 of the evacuating device 20 outward through the air hole 23 of the evacuating device 20 as shown in FIG. 4 to produce a vacuum suction force in the vacuum chamber 21 of the evacuating device 20 so as to suck each of the solder balls 1. Then, the pivoting and inverting devices 24 invert the suction fixture 10 through one hundred and eighty degrees (180°) so that the suction fixture 10 is located under the evacuating device 20 and faces the substrate 40, and each of the solder balls 1 faces downward and aligns with a respective one of the soldering pastes 41 of the substrate 40 as shown in FIG. 5. Then, the substrate 40 is moved upward toward the suction fixture 10 to rest each of the soldering pastes 41 on the respective solder ball 1 as shown in FIG. 6. Then, the evacuating device 20 introduces ambient air through the air hole 23 into the vacuum chamber 21 as shown in FIGS. 7 and 7a to release each of the solder balls 1 so that each of the solder balls 1 falls down and is implanted in the respective soldering paste 41 of the substrate 40. Finally, the substrate 40 is moved downward to space from the suction fixture 10 to detach the solder balls 1 from the suction fixture 10 as shown in FIG. 8, thereby accomplishing the ball implanting process.

As shown in FIGS. 9 and 10, when each of the ball grooves 11 of the suction fixture 10 has a smaller depth, each of the solder balls 1 largely protrudes outward from the respective ball groove 11 of the suction fixture 10, so that the solder balls 1 will interfere with and squeeze each other, thereby causing some of the solder balls 1 missing the respective ball groove 11 of the suction fixture 10. In addition, when each of the ball grooves 11 of the suction fixture 10 has a smaller depth, one of the solder balls 1 is jammed between two adjacent solder balls 1 as shown in FIG. 11, and its upper half will be scraped, scratched or cut during movement of the ball carrier 30 as shown in FIG. 12.

On the contrary, when each of the ball grooves 11 of the suction fixture 10 has a greater depth, each of the solder balls 1 is fully hidden in the respective ball groove 11 of the suction fixture 10 as shown in FIGS. 7 and 7a. Thus, when the substrate 40 is too close to the suction fixture 10, each of the soldering pastes 41 is easily stuck to the suction fixture 10, so that when the substrate 40 is spaced from the suction fixture 10, each of the soldering pastes 41 is left in the respective ball groove 11 of the suction fixture 10 as shown in FIG. 8. Alternatively, when the substrate 40 is too far from the suction fixture 10 as shown in FIG. 13, each of the solder balls 1 is easily deflected from the respective soldering paste 41 when falling down, so that each of the solder balls 1 is not combined with the respective soldering paste 41 solidly and closely as shown in FIG. 14.

BRIEF SUMMARY OF THE INVENTION

The primary objective of the present invention is to provide a method for enhancing the yield rate of ball implanting of a substrate of an integrated circuit.

In accordance with the present invention, there is provided a ball implanting method, comprising a first step of providing a suction fixture which has a plurality of ball grooves and a plurality of through holes each connected to a respective one of the ball grooves, a second step of providing an evacuating device which is combined with the suction fixture and has a plurality of connecting holes each connected to a respective one of the through holes of the suction fixture, a vacuum chamber connected to each of the connecting holes, and an air hole connected to the vacuum chamber, a third step of providing two pivoting and inverting devices which are mounted on the evacuating device, a fourth step of providing a guide plate which has a plurality of guide holes each aligning with a respective one of the ball grooves of the suction fixture, a fifth step of providing a ball carrier which is movably mounted on the guide plate and contains a plurality of solder balls, a sixth step of providing a substrate which has a plurality of soldering pastes, a seventh step of moving the guide plate to abut the suction fixture to connect each of the guide holes to the respective ball groove of the suction fixture, a eighth step of pivoting the suction fixture and the guide plate reciprocally in an inclined manner by the pivoting and inverting devices to move the ball carrier on the guide plate reciprocally and to introduce each of the solder balls through the respective guide hole of the guide plate into the respective ball groove of the suction fixture, a ninth step of drawing air in the vacuum chamber of the evacuating device outward through the air hole of the evacuating device to suck each of the solder balls, a tenth step of moving the guide plate to space from the suction fixture, an eleventh step of inverting the suction fixture by the pivoting and inverting devices until the suction fixture faces the substrate, and each of the solder balls faces and aligns with a respective one of the soldering pastes of the substrate, a twelfth step of moving the substrate to rest each of the soldering pastes on the respective solder ball, a thirteenth step of introducing ambient air through the air hole into the vacuum chamber to release each of the solder balls and to implant each of the solder balls in the respective soldering paste of the substrate, and a fourteenth step of moving the substrate to detach the solder balls from the suction fixture, thereby accomplishing the ball implanting process.

According to the primary advantage of the present invention, each of the solder balls is extended through the respective guide hole of the guide plate into the respective ball groove of the suction fixture, so that the solder balls will not protrude outward from the guide plate and will not interfere with or jam each other during movement of the ball carrier.

According to another advantage of the present invention, each of the guide holes of the guide plate compensates each of the ball grooves of the suction fixture so that each of the ball grooves of the suction fixture has a smaller depth, and each of the solder balls largely protrudes outward from the respective ball groove of the suction fixture when the substrate is moved toward the solder balls to prevent the soldering pastes of the substrate from being stuck to the suction fixture.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
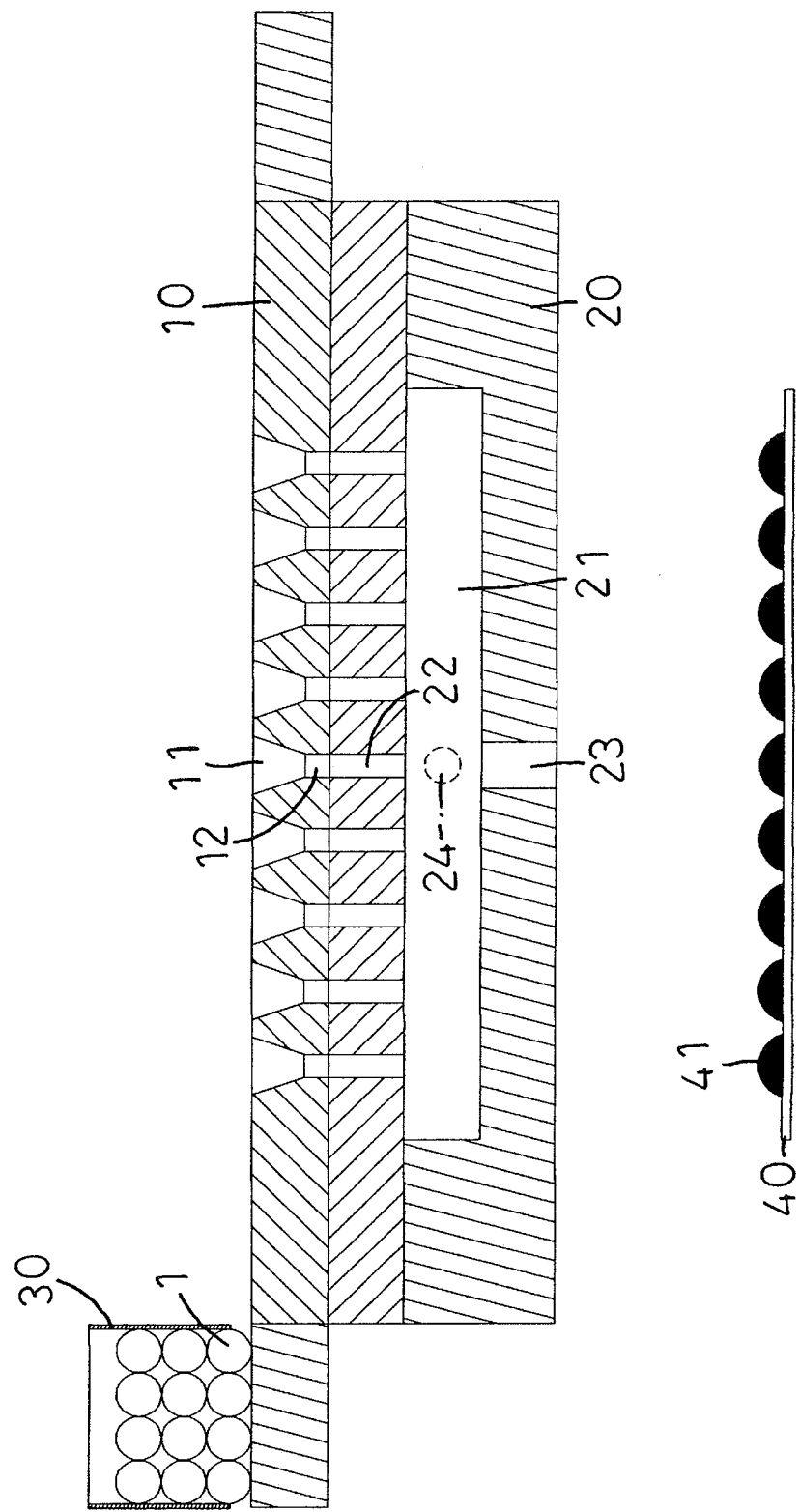
FIG. 1 is a cross-sectional view of a conventional ball implanting machine in accordance with the prior art.
Figure 2:
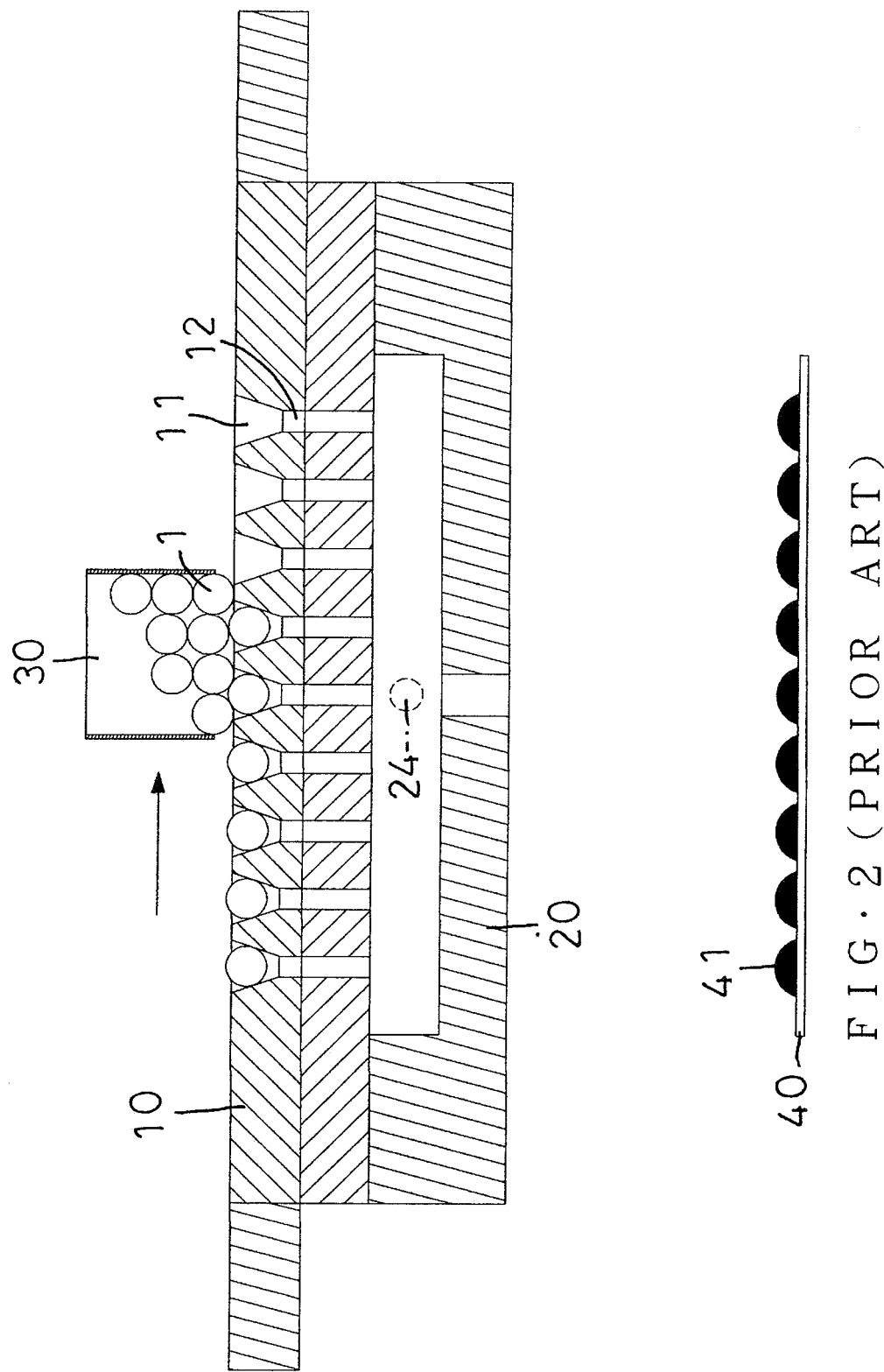
FIG. 2 is a schematic operational view of the conventional ball implanting machine as shown in FIG. 1.
Figure 3:
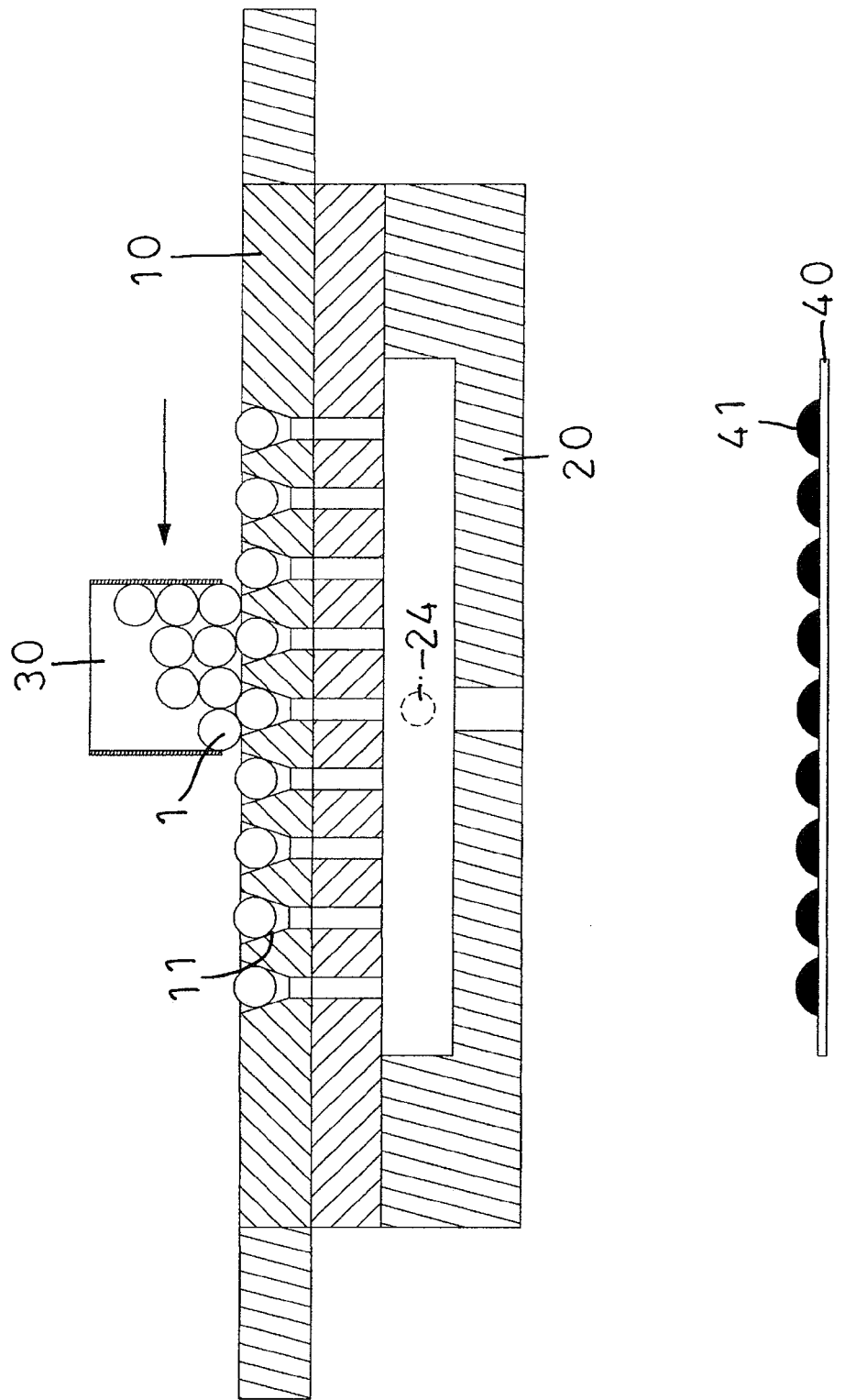
FIG. 3 is a schematic operational view of the conventional ball implanting machine as shown in FIG. 2.
Figure 4:
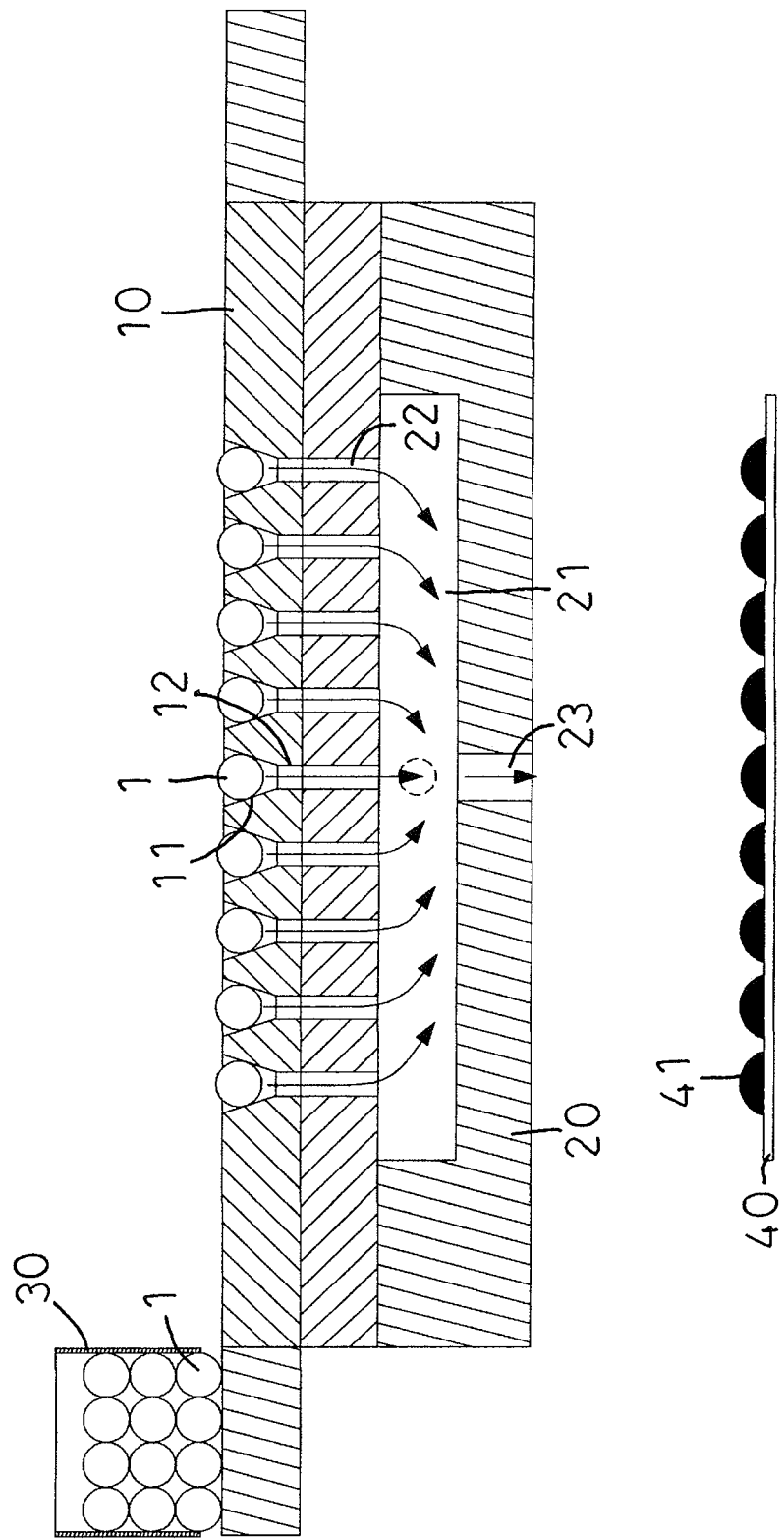
FIG. 4 is a schematic operational view of the conventional ball implanting machine as shown in FIG. 3.
Figure 5:
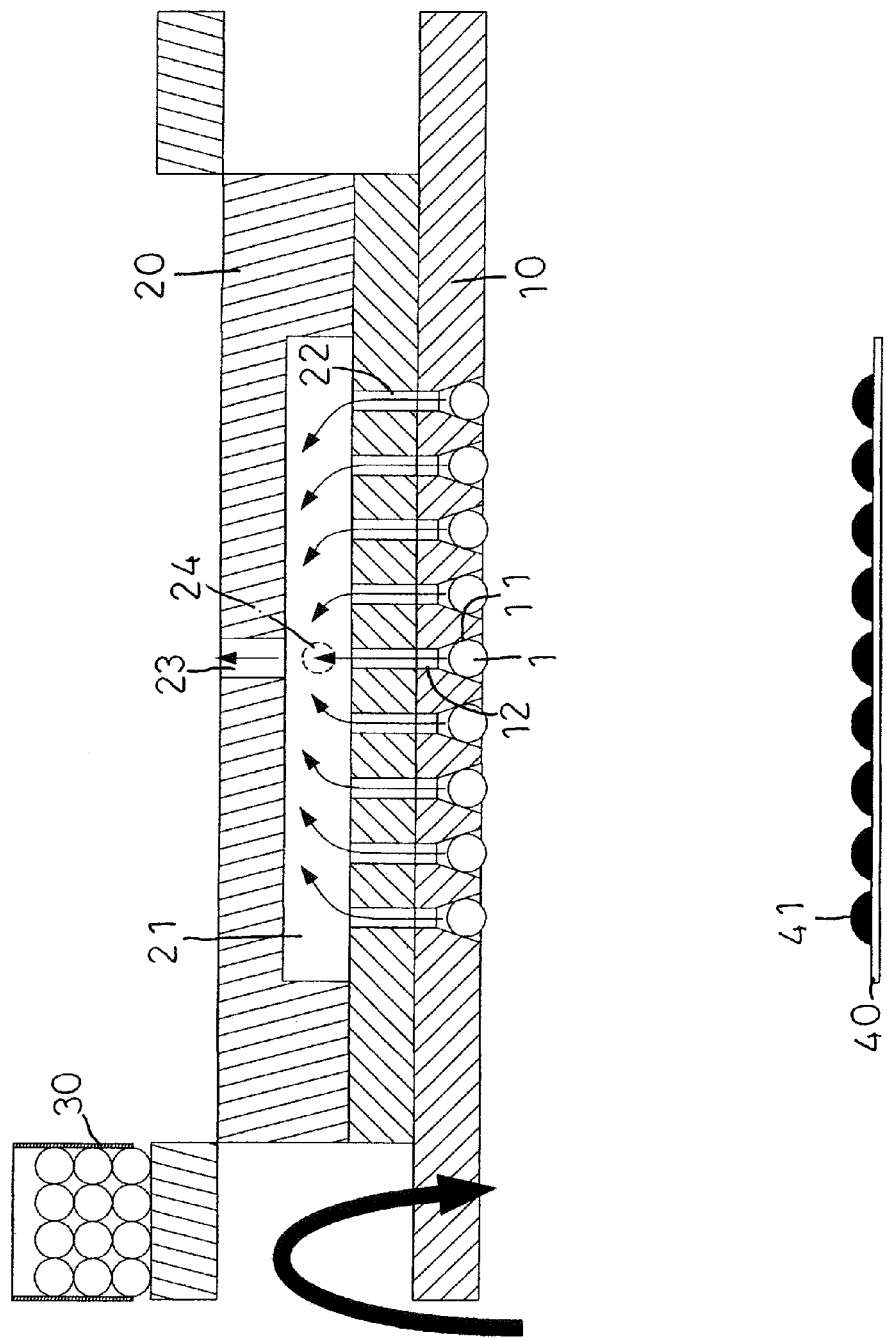
FIG. 5 is a schematic operational view of the conventional ball implanting machine as shown in FIG. 4.
Figure 6:
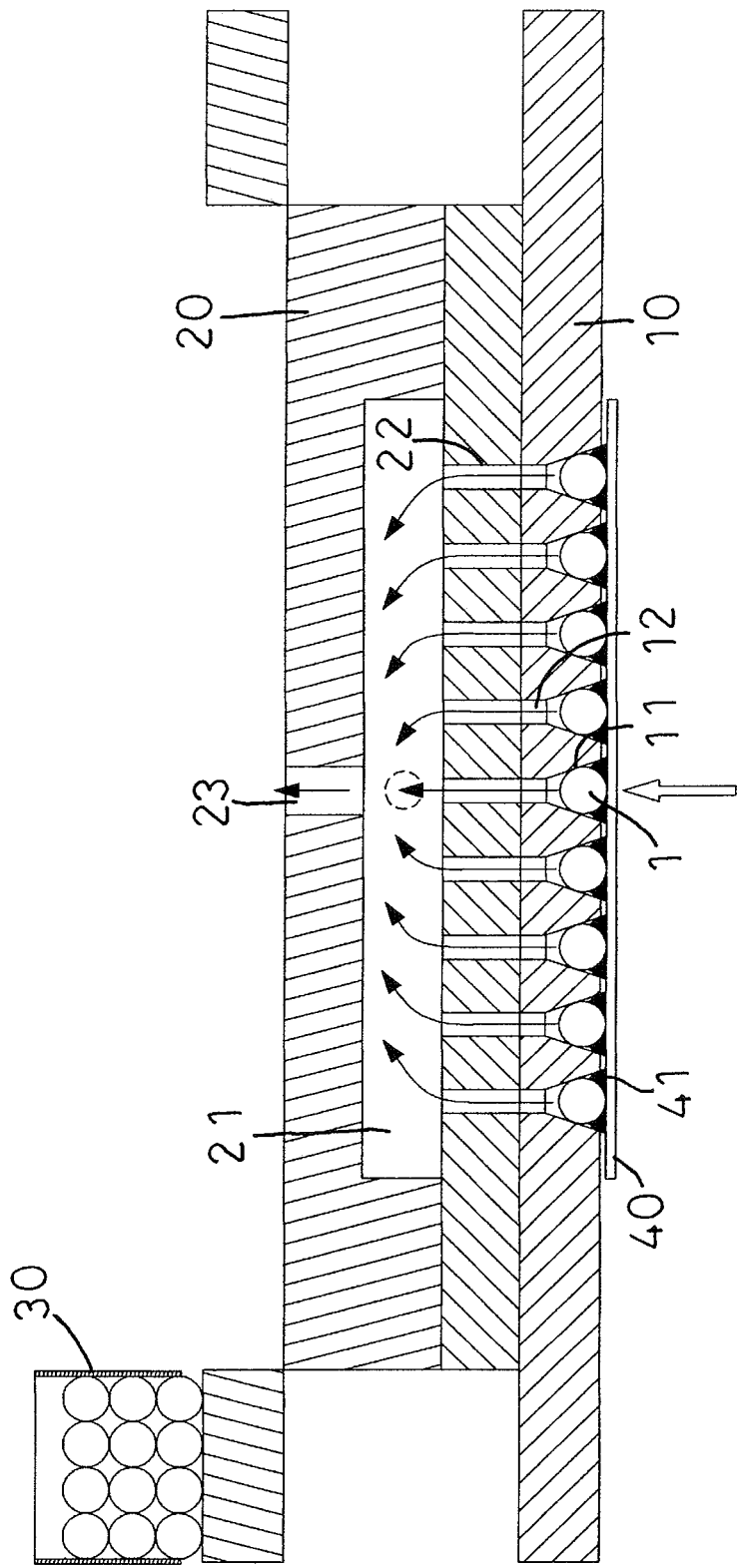
FIG. 6 is a schematic operational view of the conventional ball implanting machine as shown in FIG. 5.
Figures 7, 7A:
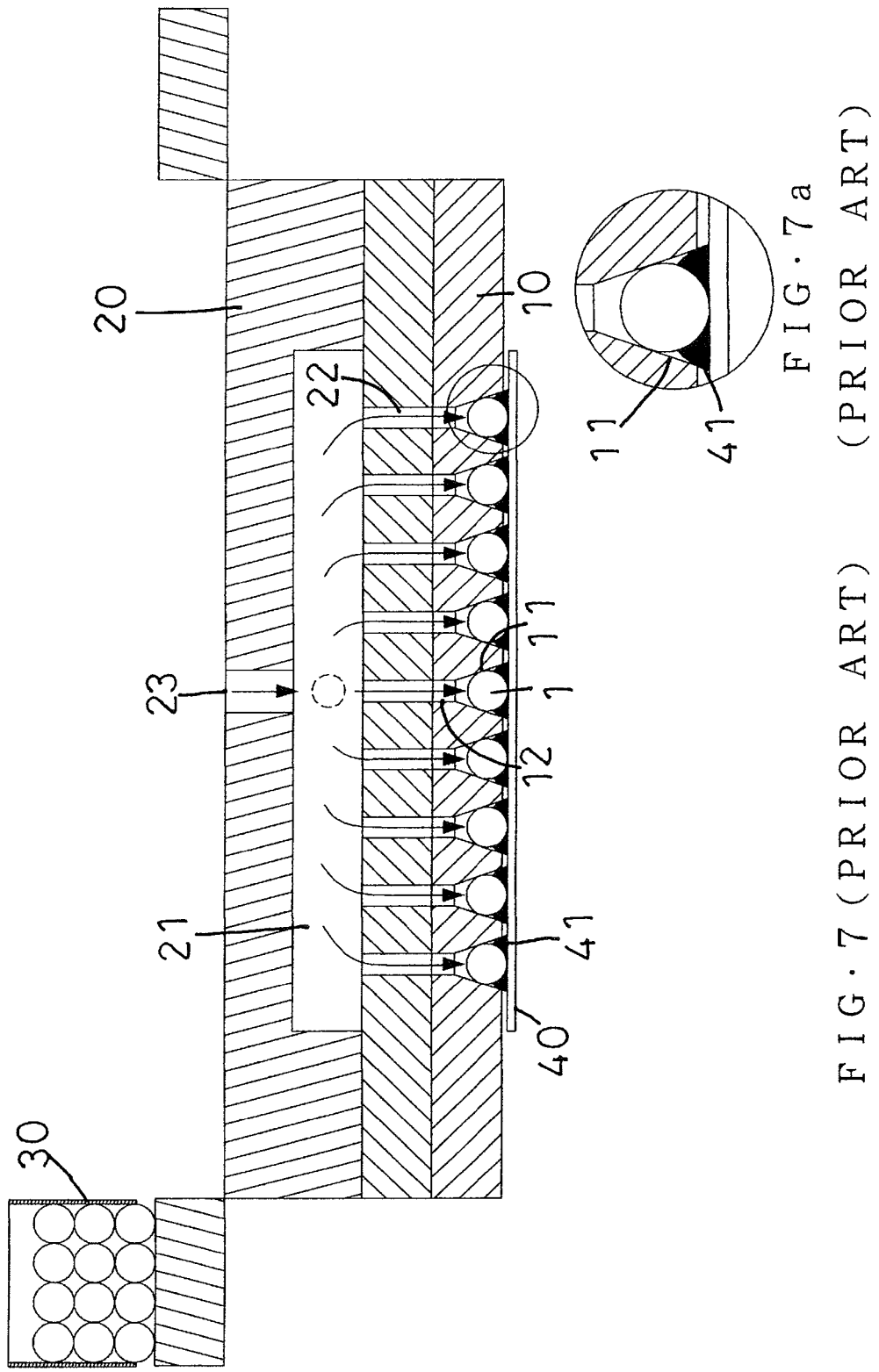
FIG. 7 is a schematic operational view of the conventional ball implanting machine as shown in FIG. 6.
FIG. 7a is a locally enlarged view of the conventional ball implanting machine as shown in FIG. 7.
Figure 8:
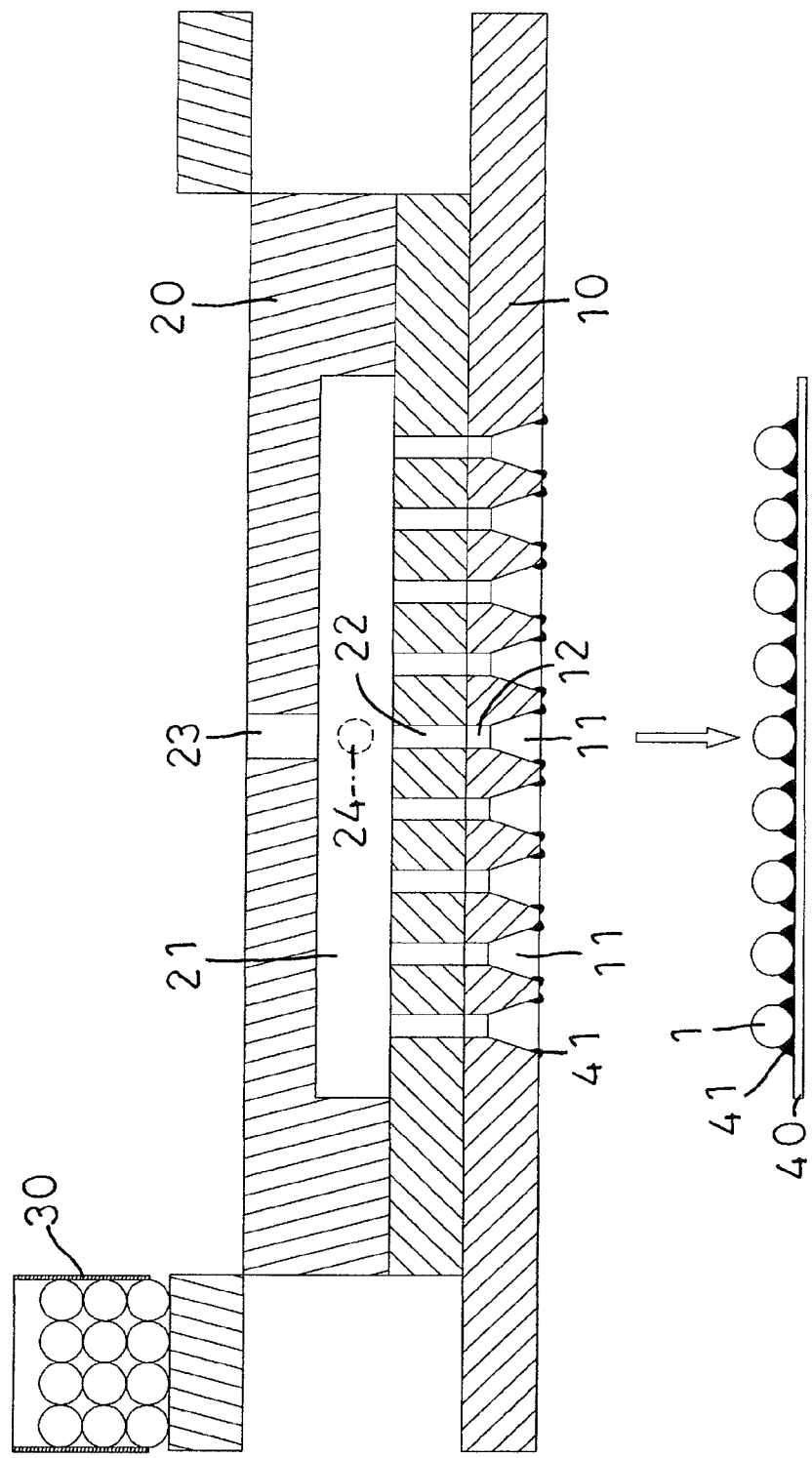
FIG. 8 is a schematic operational view of the conventional ball implanting machine as shown in FIG. 7.
Figure 9:
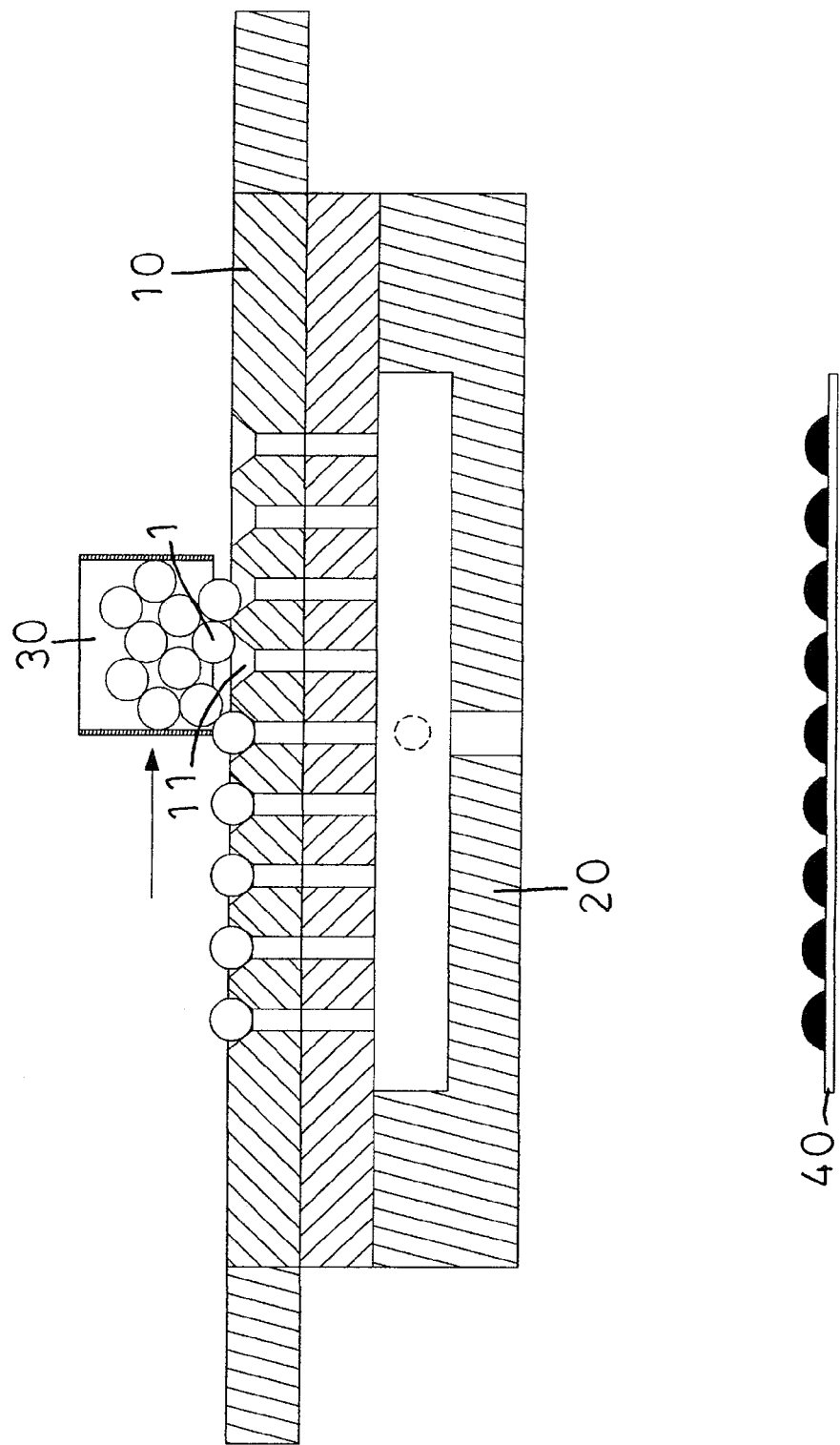
FIG. 9 is a cross-sectional view showing the solder balls squeeze each other.
Figure 10:
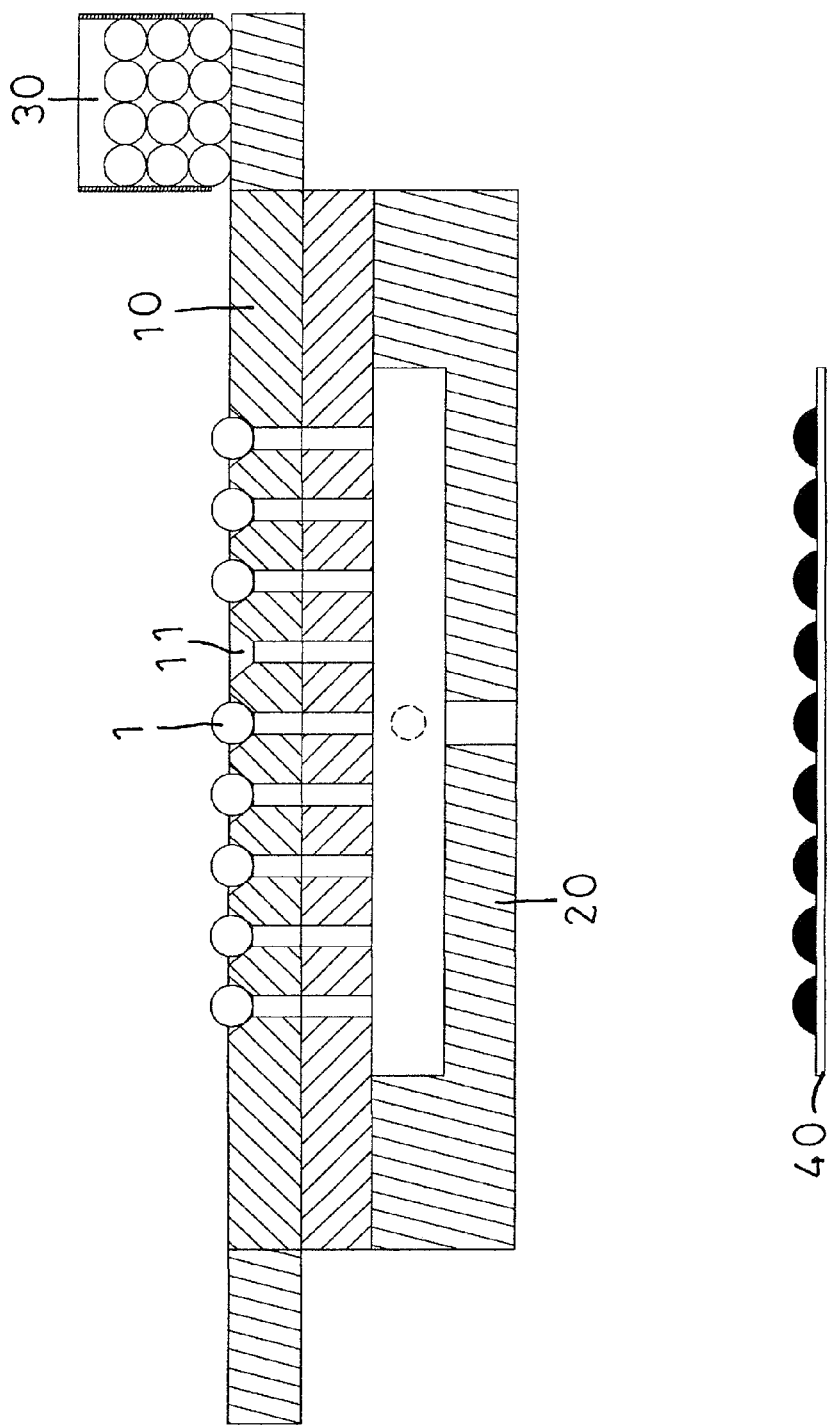
FIG. 10 is a schematic operational view of the conventional ball implanting machine as shown in FIG. 9.
Figure 11:
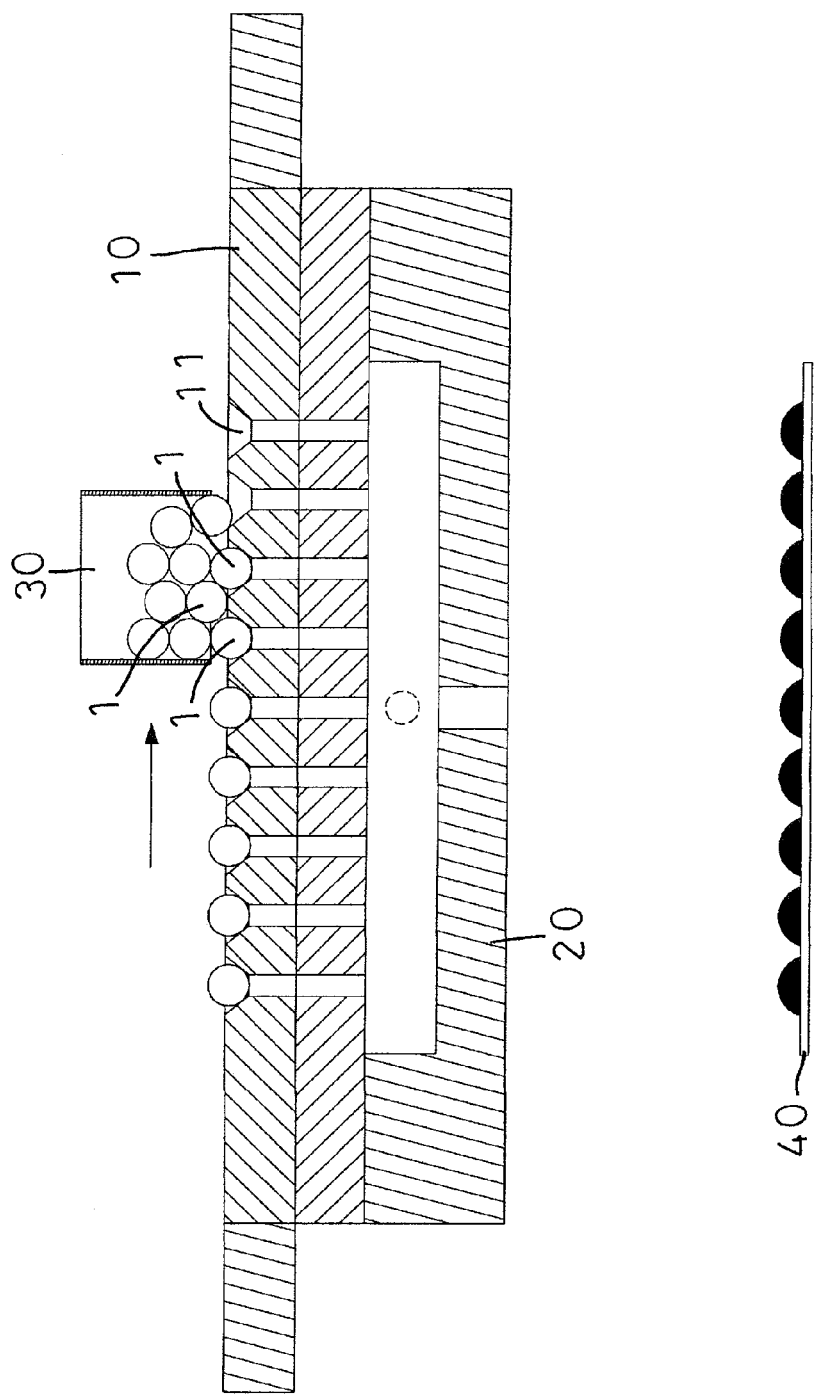
FIG. 11 is a cross-sectional view showing one of the solder balls is jammed between two adjacent solder balls.
Figure 12:
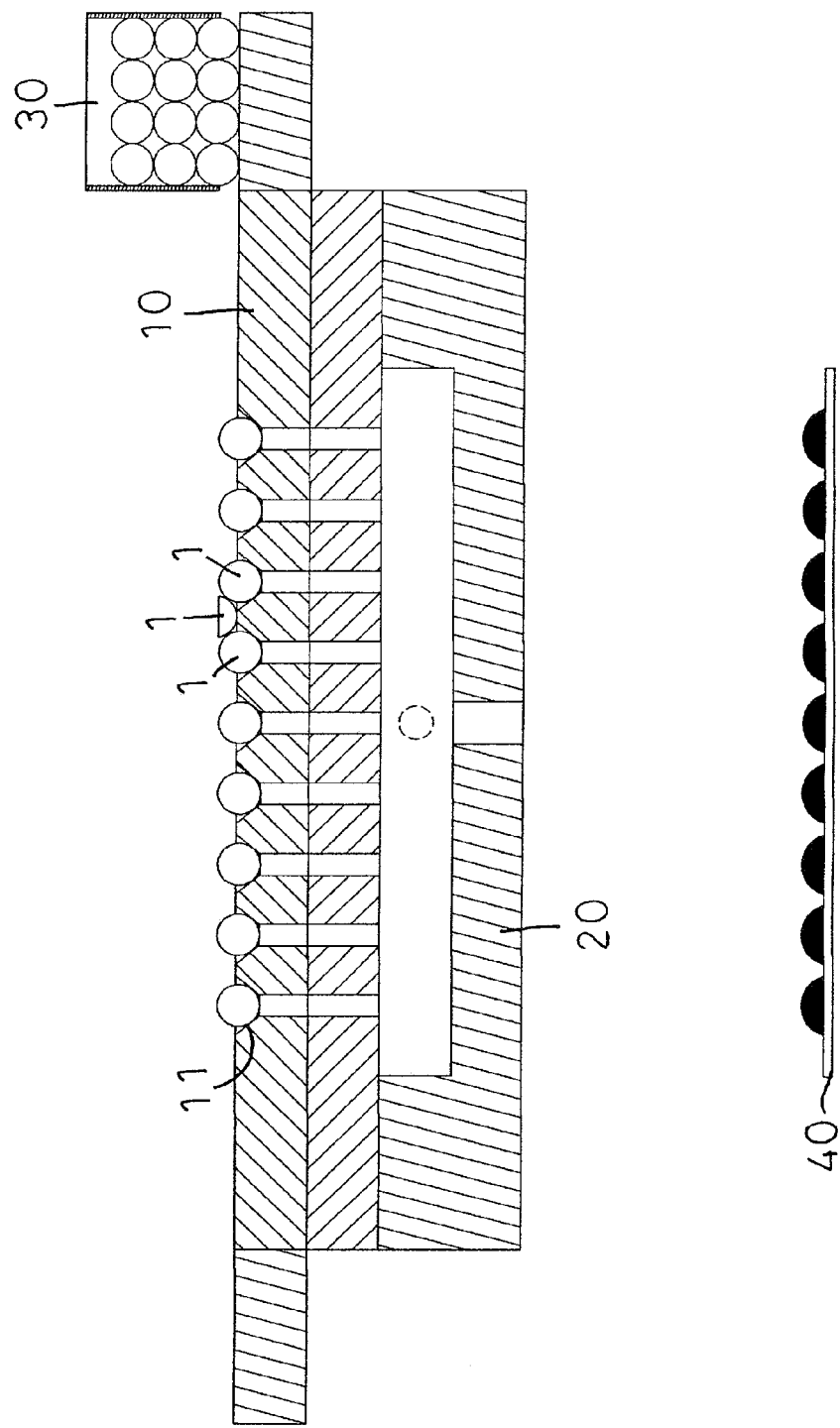
FIG. 12 is a cross-sectional view showing the upper half of one of the solder balls is cut during movement of the ball carrier.
Figure 13:
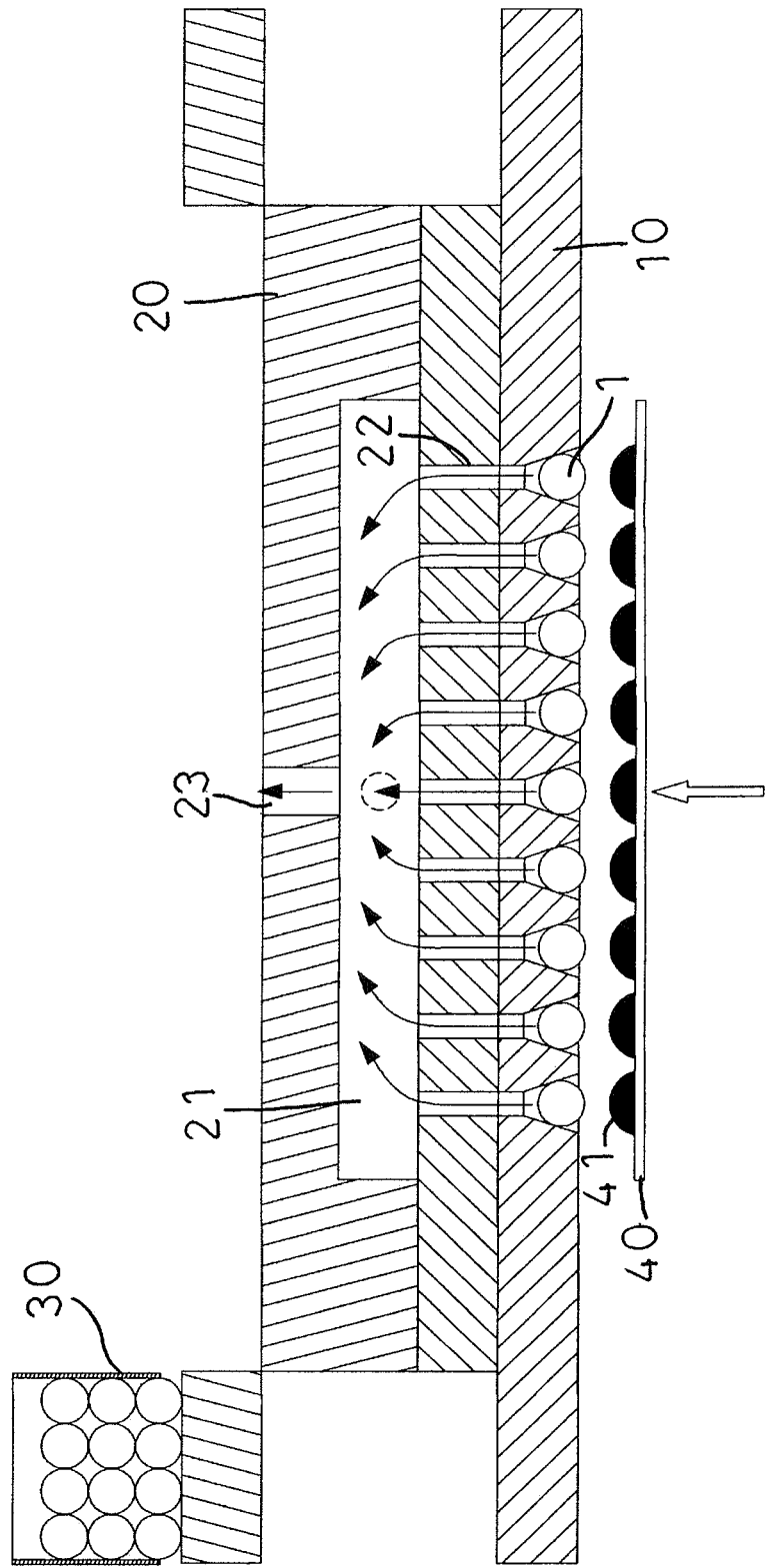
FIG. 13 is a cross-sectional view showing the substrate is too far from the suction fixture.
Figure 14:
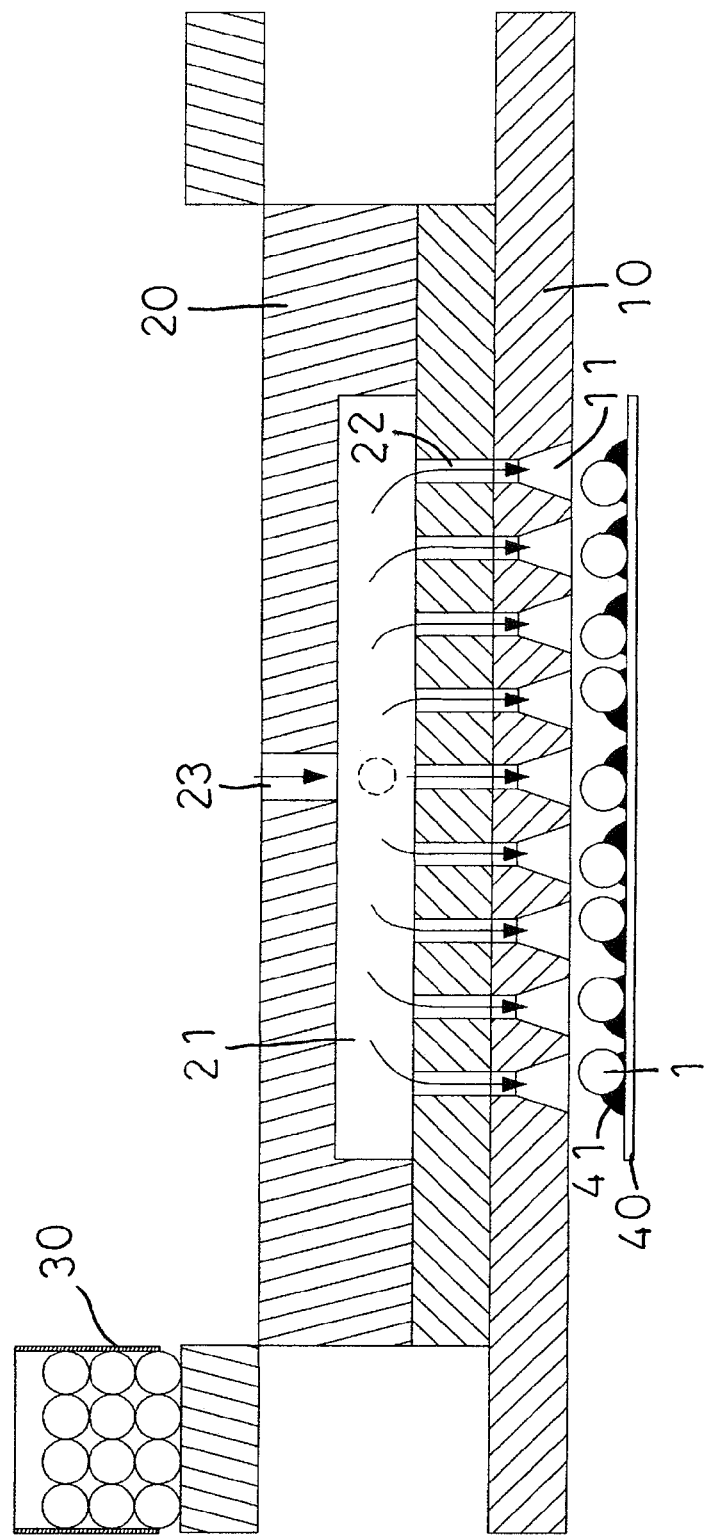
FIG. 14 is a schematic operational view of the conventional ball implanting machine as shown in FIG. 13.
Figure 15:
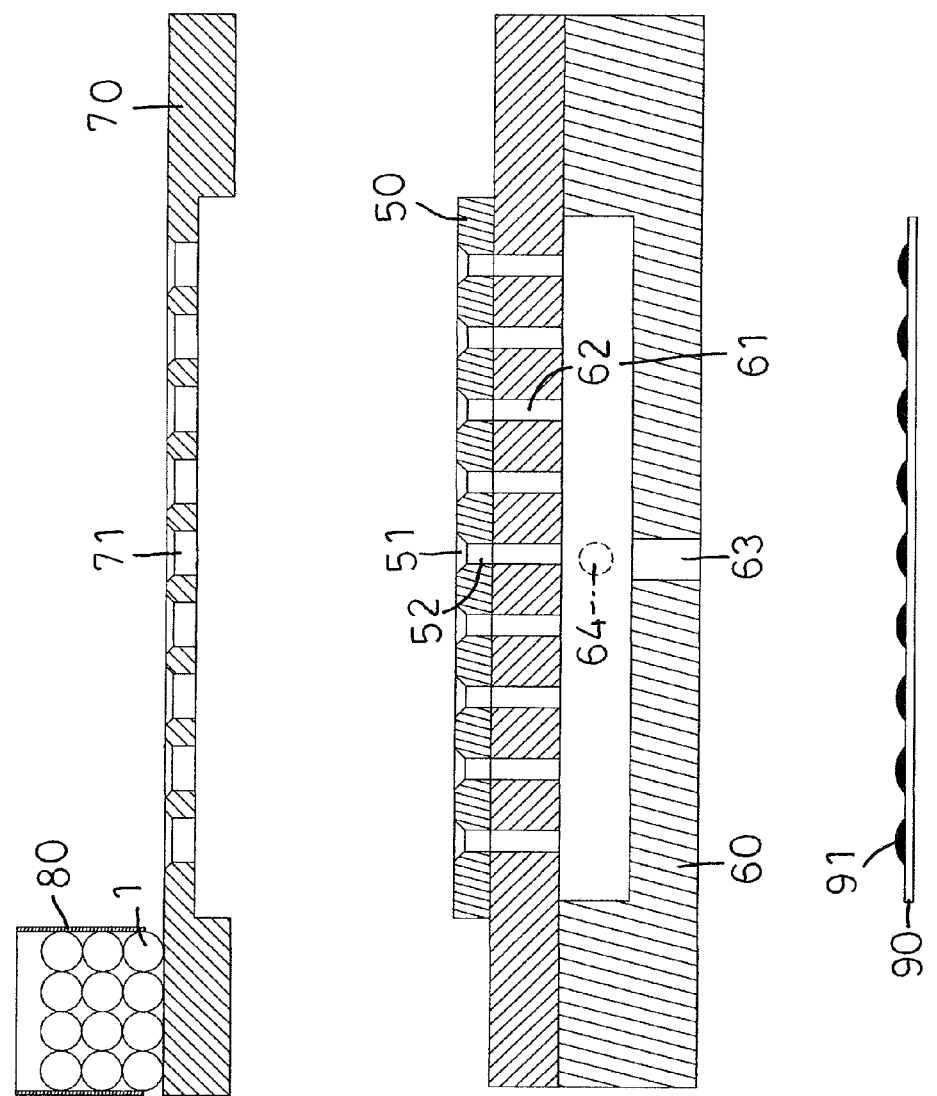
FIG. 15 is a cross-sectional view of a ball implanting machine in accordance with the preferred embodiment of the present invention.

Referring to the drawings and initially to FIG. 15, a ball implanting machine for an integrated circuit in accordance with the preferred embodiment of the present invention comprises a suction fixture 50, an evacuating device 60, two pivoting and inverting devices 64, a guide plate 70, a ball carrier 80, and a substrate 90.

The suction fixture 50 is initially located above the evacuating device 60 and faces the guide plate 70. The suction fixture 50 is provided with a plurality of ball grooves 51 and a plurality of through holes 52. Each of the ball grooves 51 of the suction fixture 50 has a larger upper opening and a smaller lower opening. Each of the through holes 52 of the suction fixture 50 is connected to the smaller lower opening of a respective one of the ball grooves 51. The suction fixture 50 and the evacuating device 60 are disposed between the guide plate 70 and the substrate 90.

The evacuating device 60 is combined with the suction fixture 50. The evacuating device 60 is provided with a vacuum chamber 61, a plurality of connecting holes 62, and an air hole 63. Each of the connecting holes 62 of the evacuating device 60 is connected between a respective one of the through holes 52 of the suction fixture 50 and the vacuum chamber 61. The vacuum chamber 61 of the evacuating device 60 is connected between each of the connecting holes 62 and the air hole 63. The air hole 63 of the evacuating device 60 draws air outward from the vacuum chamber 61 or introduces ambient air into the vacuum chamber 61.

The pivoting and inverting devices 64 are mounted on two opposite sides of the evacuating device 60 to pivot and invert the suction fixture 50 and the evacuating device 60.

The guide plate 70 is located above and faces the suction fixture 50. The guide plate 70 is provided with a plurality of guide holes 71 each aligning with a respective one of the ball grooves 51 of the suction fixture 50. The guide plate 70 is movable to abut the suction fixture 50 to connect each of the guide holes 71 to the respective ball groove 51 of the suction fixture 50.

The ball carrier 80 is movably mounted on the guide plate 70. The ball carrier 80 contains a plurality of solder balls 1. Each of the solder balls 1 is introduced through a respective one of the guide holes 71 of the guide plate 70 into a respective one of the ball grooves 51 of the suction fixture 50.

The substrate 90 is located under the evacuating device 60. The substrate 90 is provided with a plurality of soldering pastes 91 each aligning with a respective one of the solder balls 1.

Figure 16:
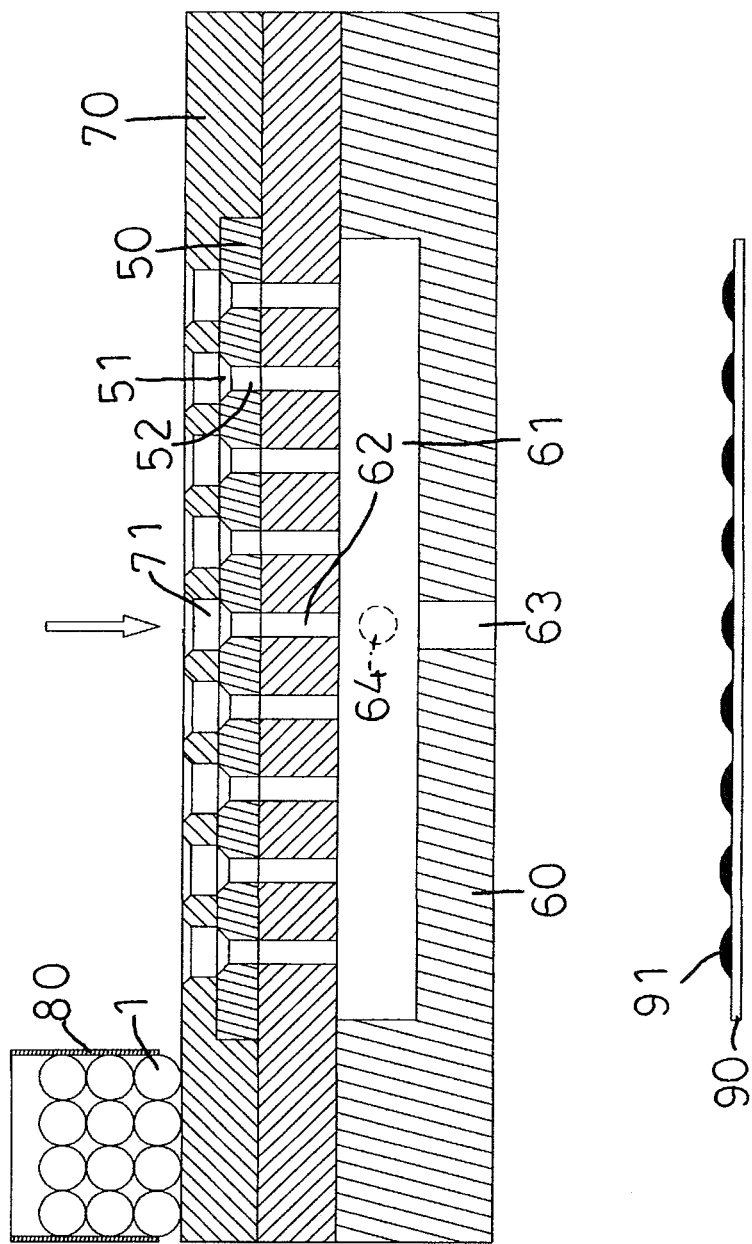
FIG. 16 is a schematic operational view of the ball implanting machine as shown in FIG. 15.
Figure 17:
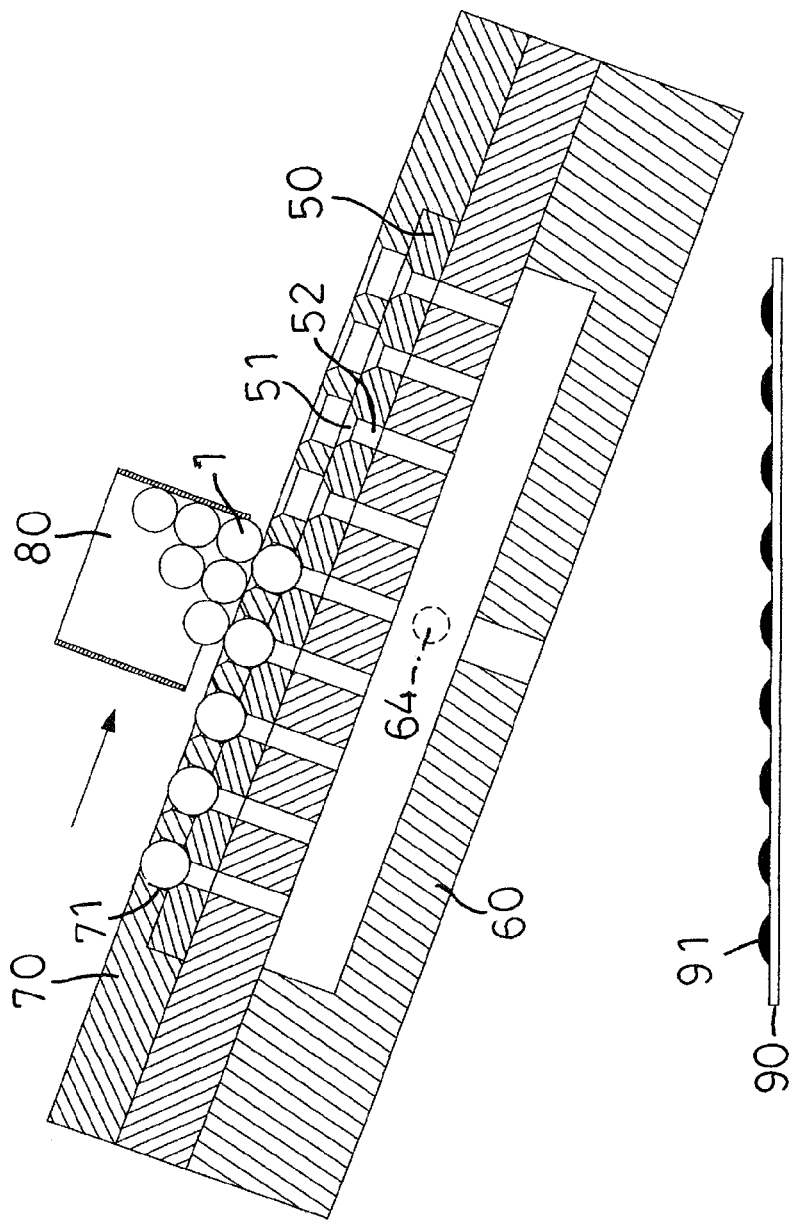
FIG. 17 is a schematic operational view of the ball implanting machine as shown in FIG. 16.
Figure 18:
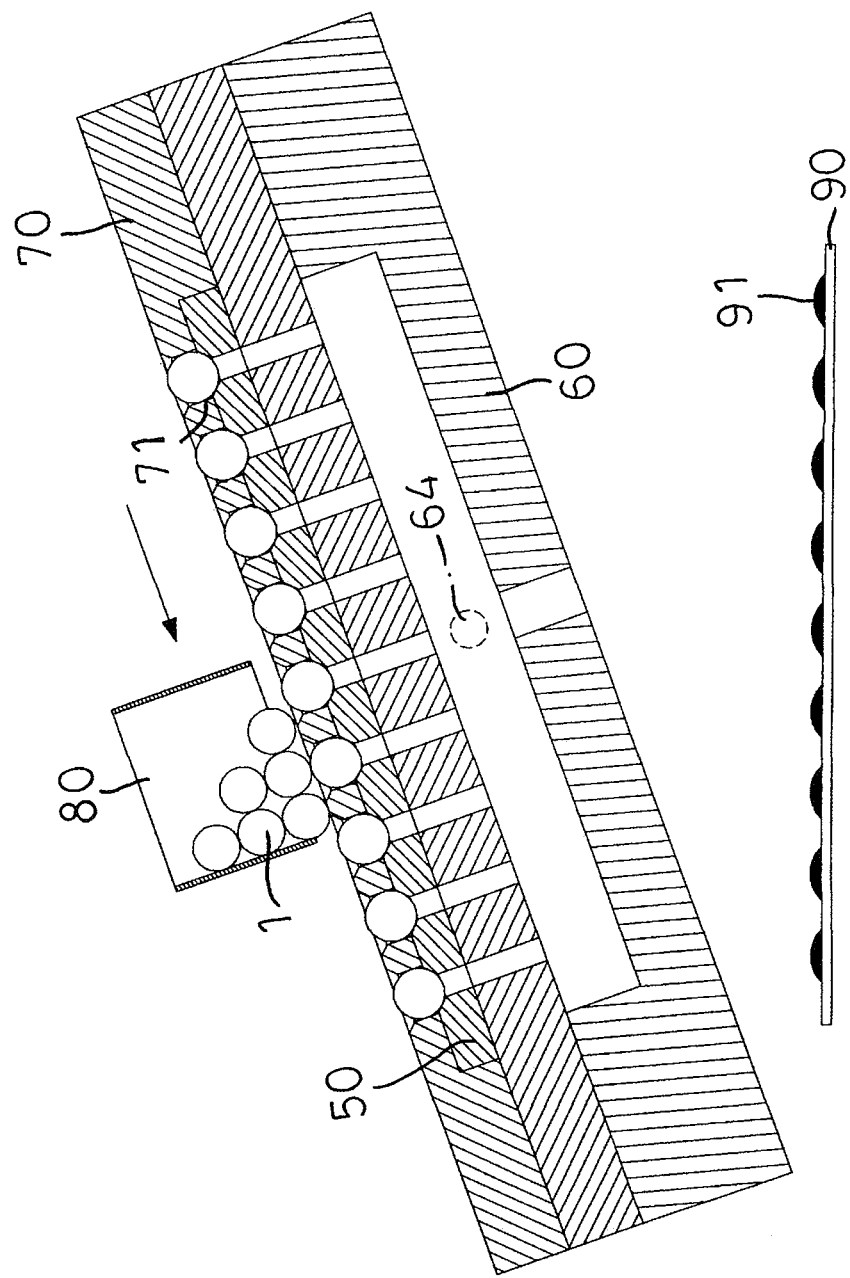
FIG. 18 is a schematic operational view of the ball implanting machine as shown in FIG. 17.
Figure 19:
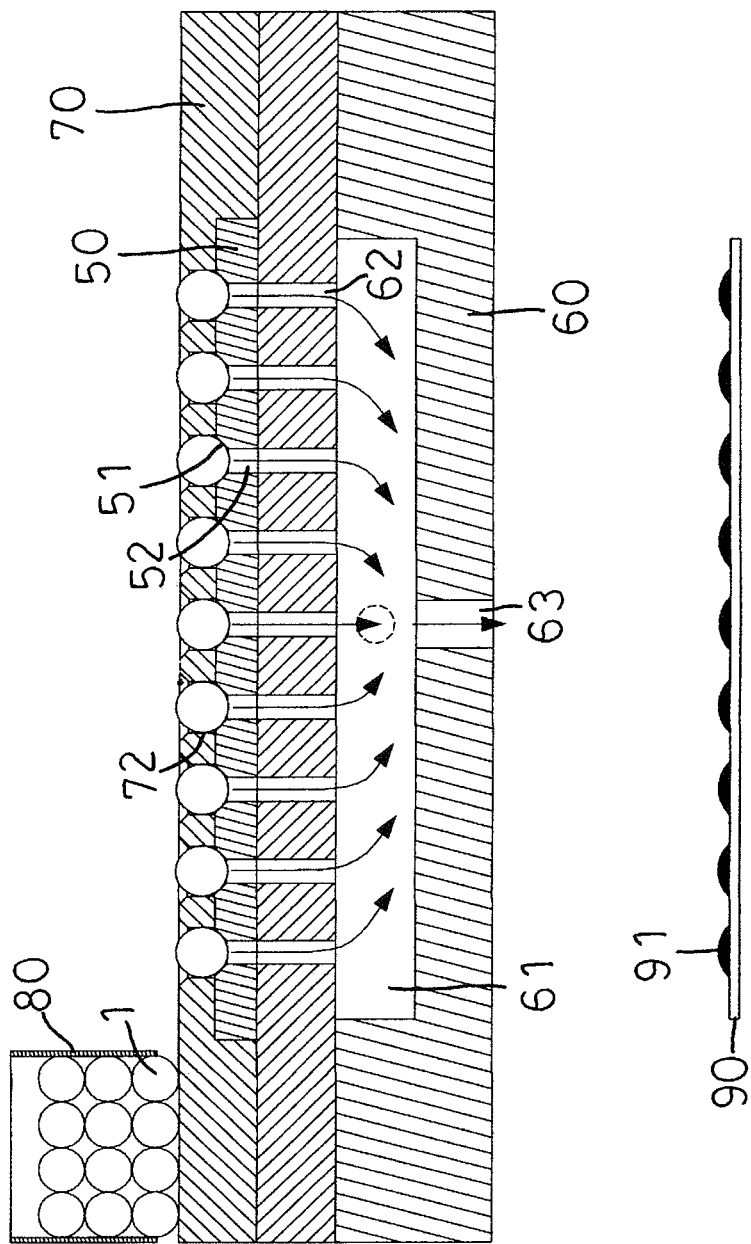
FIG. 19 is a schematic operational view of the ball implanting machine as shown in FIG. 18.
Figure 20:
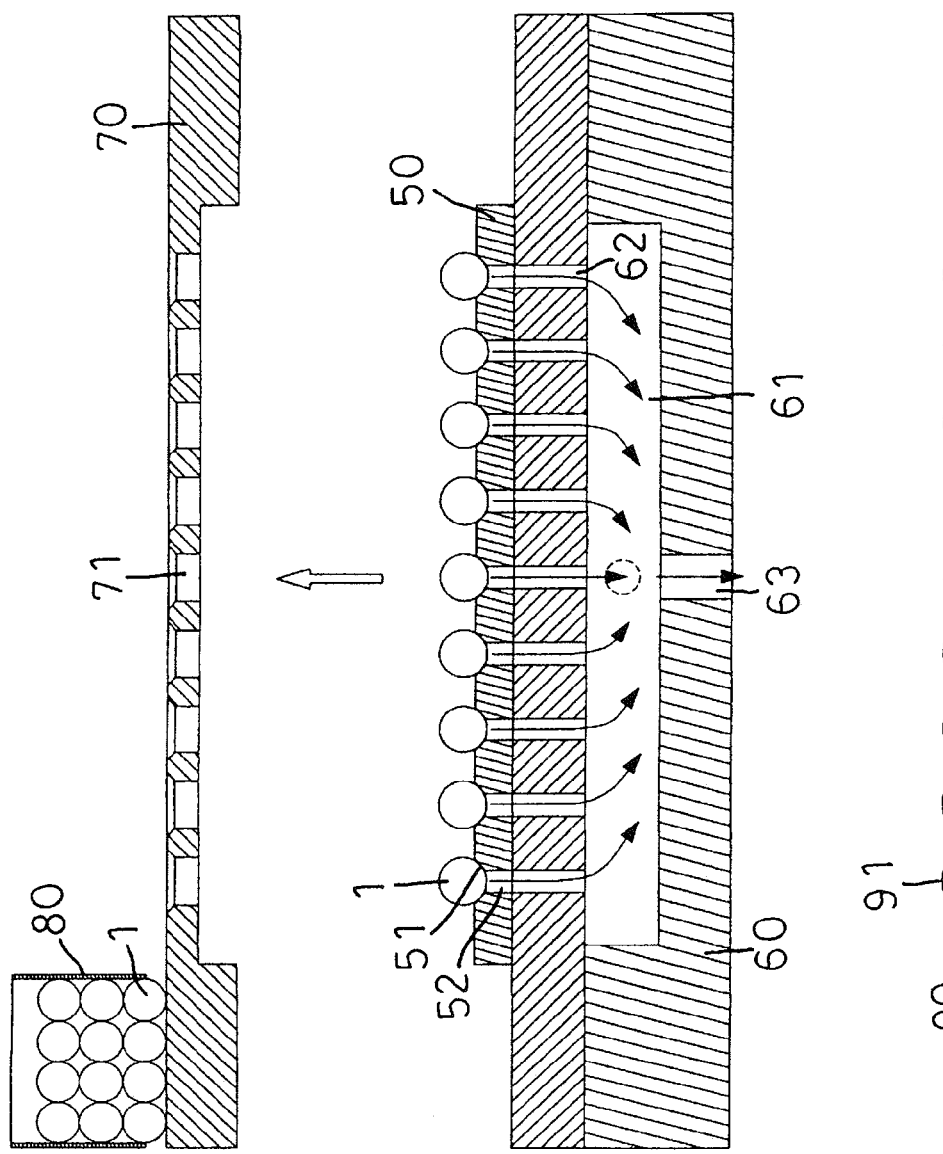
FIG. 20 is a schematic operational view of the ball implanting machine as shown in FIG. 19.
Figure 21:
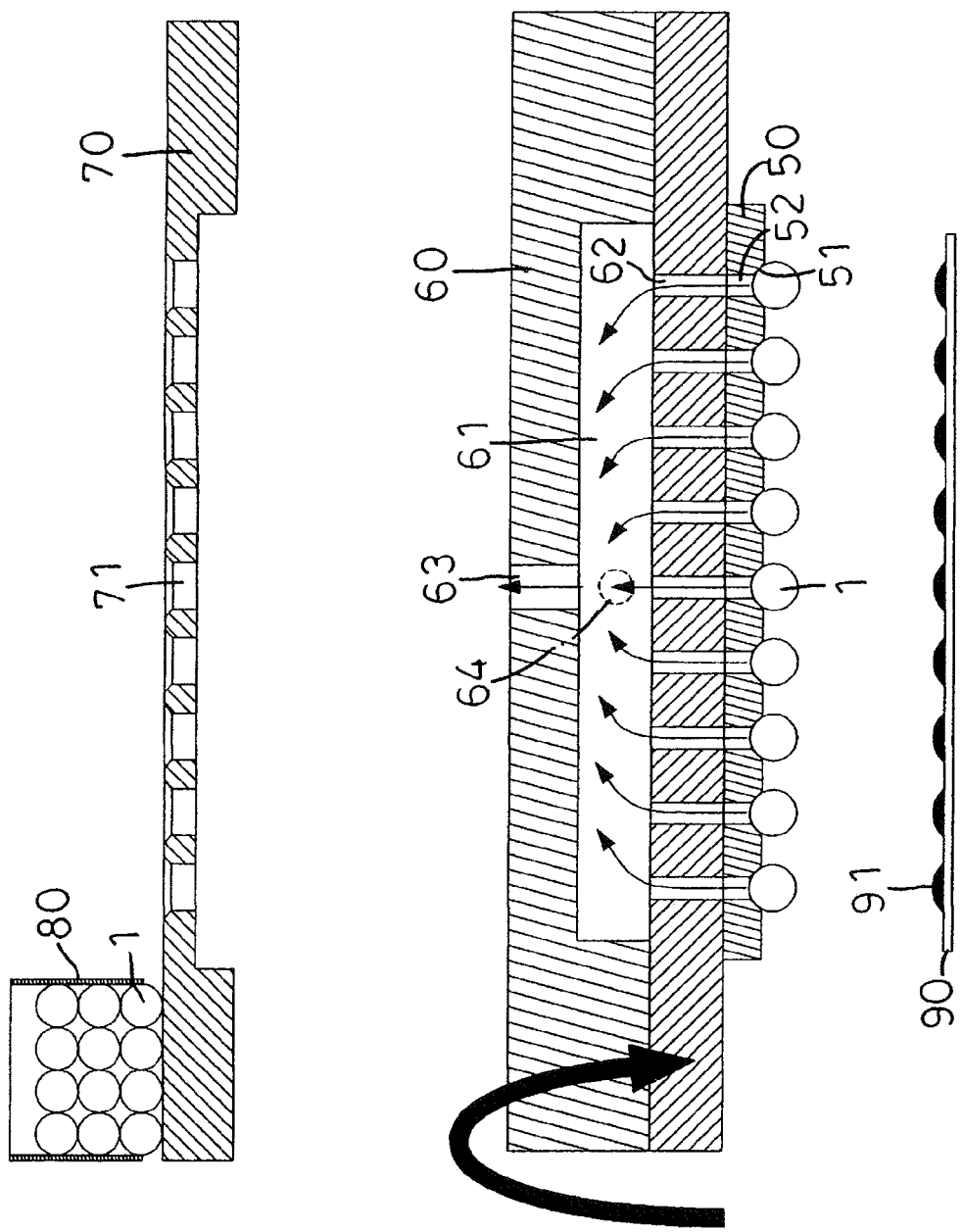
FIG. 21 is a schematic operational view of the ball implanting machine as shown in FIG. 20.
Figure 22:
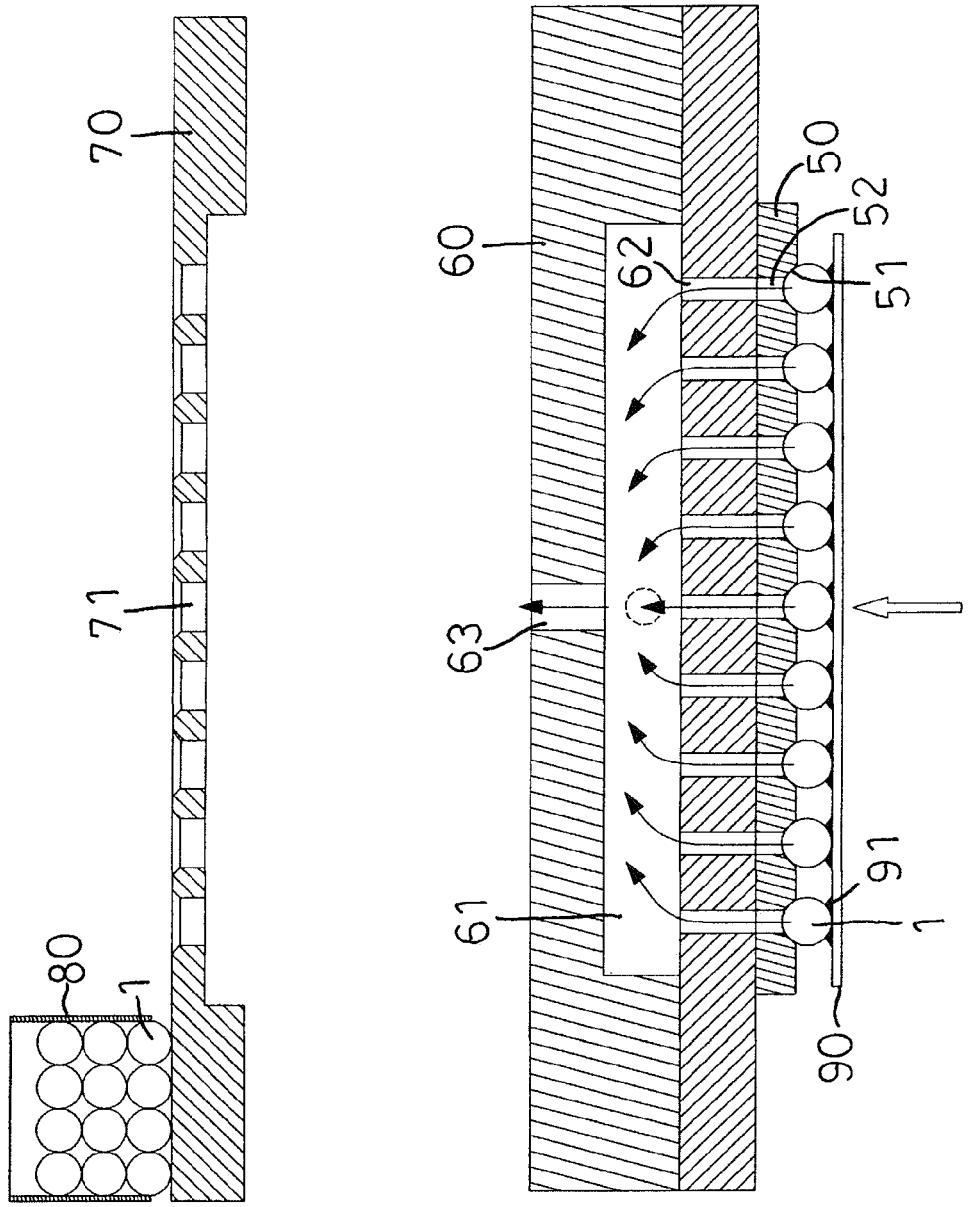
FIG. 22 is a schematic operational view of the ball implanting machine as shown in FIG. 21.
Figure 23:
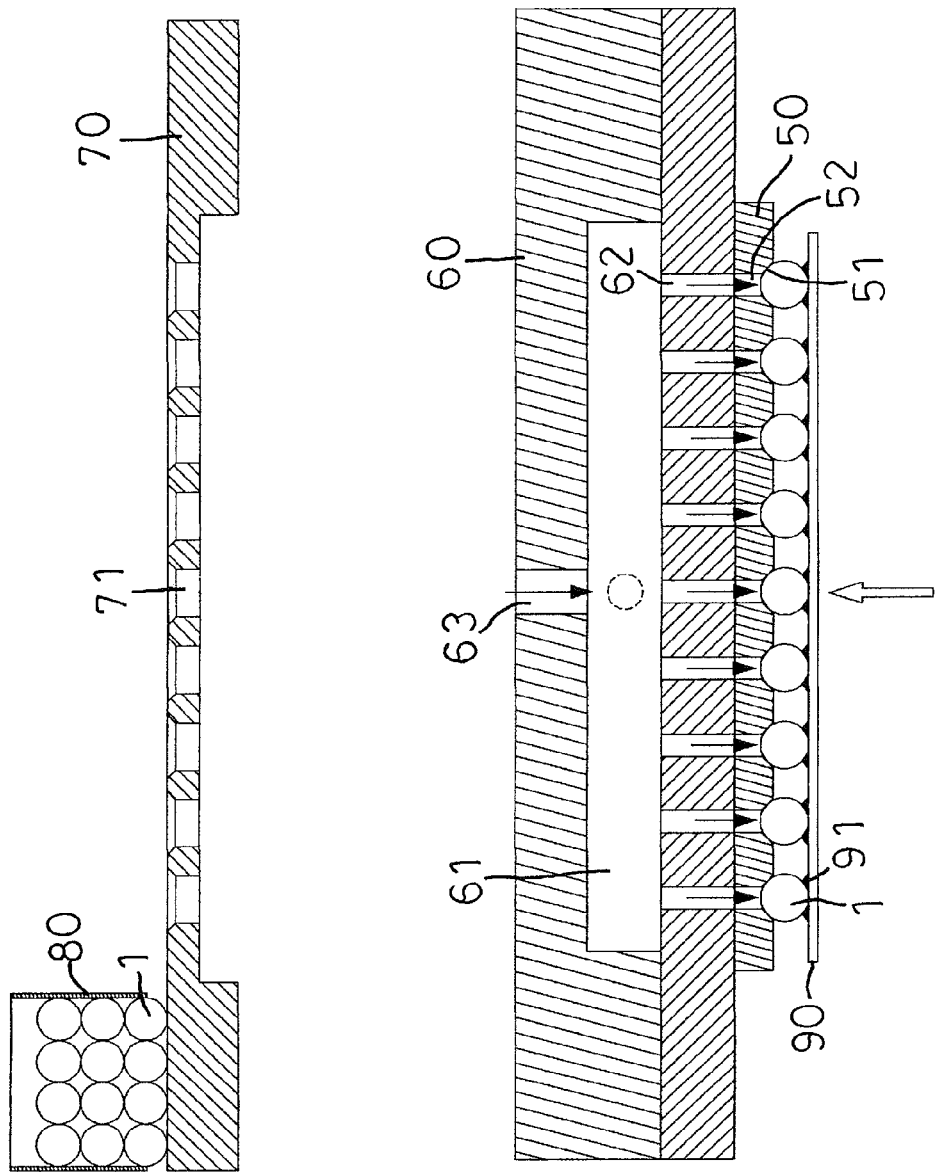
FIG. 23 is a schematic operational view of the ball implanting machine as shown in FIG. 22.
Figure 24:
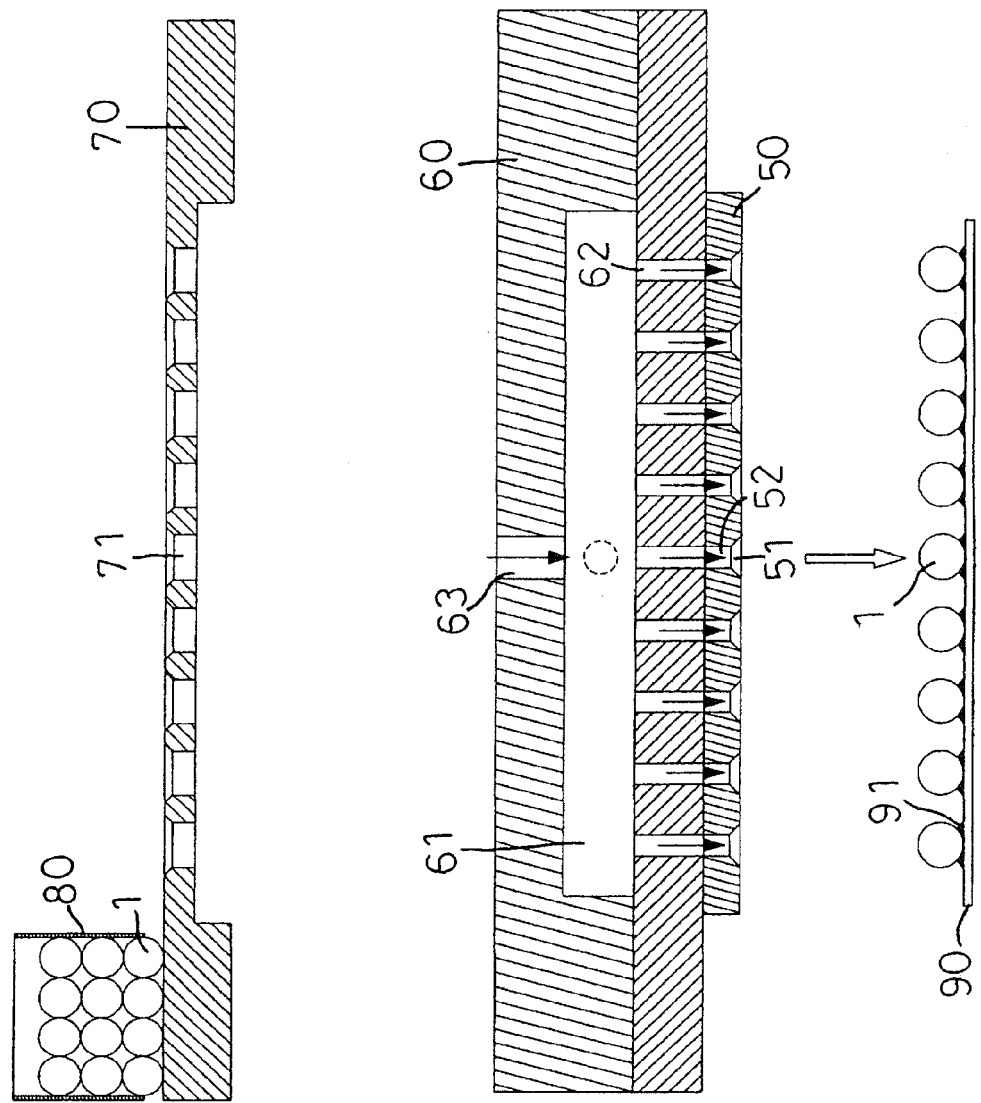
FIG. 24 is a schematic operational view of the ball implanting machine as shown in FIG. 23.

In operation, referring to FIGS. 16-24 with reference to FIG. 15, the suction fixture 50 is initially located above the evacuating device 60 and faces the guide plate 70 as shown in FIG. 15. Then, the guide plate 70 is moved downward to abut the suction fixture 50 as shown in FIG. 16 to connect each of the guide holes 71 to the respective ball groove 51 of the suction fixture 50. Then, the pivoting and inverting devices 64 pivot the suction fixture 50 and the guide plate 70 reciprocally in an inclined manner as shown in FIGS. 17 and 18 to move the ball carrier 80 on the guide plate 70 reciprocally and to introduce each of the solder balls 1 through the respective guide hole 71 of the guide plate 70 into the respective ball groove 51 of the suction fixture 50. Then, the pivoting and inverting devices 64 pivot the suction fixture 50 to return the suction fixture 50 to the original position as shown in FIG. 19. Then, the evacuating device 60 draws air in the vacuum chamber 61 of the evacuating device 60 outward through the air hole 63 of the evacuating device 60 as shown in FIG. 19 to produce a vacuum suction force in the vacuum chamber 61 of the evacuating device 60 so as to suck each of the solder balls 1. Then, the guide plate 70 is moved upward to space from the suction fixture 50 as shown in FIG. 20 so as to detach each of the guide holes 71 from the respective ball groove 51 of the suction fixture 50. Then, the pivoting and inverting devices 64 invert the suction fixture 50 through one hundred and eighty degrees (180°) so that the suction fixture 50 is located under the evacuating device 60 and faces the substrate 90, and each of the solder balls 1 faces downward and aligns with a respective one of the soldering pastes 91 of the substrate 90 as shown in FIG. 21. Then, the substrate 90 is moved upward toward the suction fixture 50 to rest each of the soldering pastes 91 on the respective solder ball 1 as shown in FIG. 22. Then, the evacuating device 60 introduces ambient air through the air hole 63 into the vacuum chamber 61 as shown in FIG. 23 to eliminate the vacuum suction force in the vacuum chamber 61 of the evacuating device 60 so as to release each of the solder balls 1 so that each of the solder balls 1 falls down and is implanted in the respective soldering paste 91 of the substrate 90. Finally, the substrate 90 is moved downward to space from the suction fixture 50 to detach the solder balls 1 from the suction fixture 50 as shown in FIG. 24, thereby accomplishing the ball implanting process.

In practice, a ball implanting method for an integrated circuit in accordance with the preferred embodiment of the present invention comprises a first step of providing a suction fixture 50 which has a plurality of ball grooves 51 and a plurality of through holes 52 each connected to a respective one of the ball grooves 51, a second step of providing an evacuating device 60 which is combined with the suction fixture 50 and has a plurality of connecting holes 62 each connected to a respective one of the through holes 52 of the suction fixture 50, a vacuum chamber 61 connected to each of the connecting holes 62, and an air hole 63 connected to the vacuum chamber 61, a third step of providing two pivoting and inverting devices 64 which are mounted on two opposite sides of the evacuating device 60, a fourth step of providing a guide plate 70 which is located above the suction fixture 50 and has a plurality of guide holes 71 each aligning with a respective one of the ball grooves 51 of the suction fixture 50, a fifth step of providing a ball carrier 80 which is movably mounted on the guide plate 70 and contains a plurality of solder balls 1, a sixth step of providing a substrate 90 which is located under the evacuating device 60 and has a plurality of soldering pastes 91, a seventh step of moving the guide plate 70 downward to abut the suction fixture 50 to connect each of the guide holes 71 to the respective ball groove 51 of the suction fixture 50, a eighth step of pivoting the suction fixture 50 and the guide plate 70 reciprocally in an inclined manner by the pivoting and inverting devices 64 to move the ball carrier 80 on the guide plate 70 reciprocally and to introduce each of the solder balls 1 through the respective guide hole 71 of the guide plate 70 into the respective ball groove 51 of the suction fixture 50, a ninth step of drawing air in the vacuum chamber 61 of the evacuating device 60 outward through the air hole 63 of the evacuating device 60 to suck each of the solder balls 1, a tenth step of moving the guide plate 70 upward to space from the suction fixture 50, an eleventh step of inverting the suction fixture 50 by the pivoting and inverting devices 64 until the suction fixture 50 faces the substrate 90, and each of the solder balls 1 faces downward and aligns with a respective one of the soldering pastes 91 of the substrate 90, a twelfth step of moving the substrate 90 upward to rest each of the soldering pastes 91 on the respective solder ball 1, a thirteenth step of introducing ambient air through the air hole 63 into the vacuum chamber 61 to release each of the solder balls 1 and to implant each of the solder balls 1 in the respective soldering paste 91 of the substrate 90, and a fourteenth step of moving the substrate 90 downward to detach the solder balls 1 from the suction fixture 50, thereby accomplishing the ball implanting process.

Accordingly, each of the solder balls 1 is extended through the respective guide hole 71 of the guide plate 70 into the respective ball groove 51 of the suction fixture 50, so that the solder balls 1 will not protrude outward from the guide plate 70 and will not interfere with or jam each other during movement of the ball carrier 80. In addition, each of the guide holes 71 of the guide plate 70 compensates each of the ball grooves 51 of the suction fixture 50 so that each of the ball grooves 51 of the suction fixture 50 has a smaller depth, and each of the solder balls 1 largely protrudes outward from the respective ball groove 51 of the suction fixture 50 when the substrate 90 is moved toward the solder balls 1 to prevent the soldering pastes 91 of the substrate 90 from being stuck to the suction fixture 50.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A ball implanting method, comprising:
   a first step of providing a suction fixture which has a plurality of ball grooves and a plurality of through holes each connected to a respective one of the ball grooves;
   a second step of providing an evacuating device which is combined with the suction fixture and has a plurality of connecting holes each connected to a respective one of the through holes of the suction fixture, a vacuum chamber connected to each of the connecting holes, and an air hole connected to the vacuum chamber;
   a third step of providing two pivoting and inverting devices which are mounted on the evacuating device;
   a fourth step of providing a guide plate which has a plurality of guide holes each aligning with a respective one of the ball grooves of the suction fixture;
   a fifth step of providing a ball carrier which is movably mounted on the guide plate and contains a plurality of solder balls;
   a sixth step of providing a substrate which has a plurality of soldering pastes;
   a seventh step of moving the guide plate to abut the suction fixture to connect each of the guide holes to the respective ball groove of the suction fixture;
   a eighth step of pivoting the suction fixture and the guide plate reciprocally in an inclined manner by the pivoting and inverting devices to move the ball carrier on the guide plate reciprocally and to introduce each of the solder balls through the respective guide hole of the guide plate into the respective ball groove of the suction fixture;

a ninth step of drawing air in the vacuum chamber of the evacuating device outward through the air hole of the evacuating device to suck each of the solder balls;

a tenth step of moving the guide plate to space from the suction fixture;

an eleventh step of inverting the suction fixture by the pivoting and inverting devices until the suction fixture faces the substrate, and each of the solder balls faces and aligns with a respective one of the soldering pastes of the substrate;

a twelfth step of moving the substrate to rest each of the soldering pastes on the respective solder ball;

a thirteenth step of introducing ambient air through the air hole into the vacuum chamber to release each of the solder balls and to implant each of the solder balls in the respective soldering paste of the substrate; and a fourteenth step of moving the substrate to detach the solder balls from the suction fixture, thereby accomplishing the ball implanting process.

2. The ball implanting method of claim 1, wherein the suction fixture and the evacuating device are disposed between the guide plate and the substrate.

3. The ball implanting method of claim 1, wherein the guide plate is located above and faces the suction fixture.

4. The ball implanting method of claim 1, wherein the substrate is located under the evacuating device.

5. The ball implanting method of claim 1, wherein the suction fixture is initially located above the evacuating device and faces the guide plate.

6. The ball implanting method of claim 1, wherein each of the ball grooves of the suction fixture has a larger upper opening and a smaller lower opening.

7. The ball implanting method of claim 1, wherein the ball carrier 80 is movably mounted on the guide plate.

* * * * *